US010609646B2

(12) United States Patent
Wong et al.

(10) Patent No.: US 10,609,646 B2
(45) Date of Patent: Mar. 31, 2020

(54) INTELLIGENT MANAGEMENT OF A PLURALITY OF COMMUNICATIONS LINKS

(71) Applicant: FITBIT, INC., San Francisco, CA (US)

(72) Inventors: Yoon Kean Wong, Redwood City, CA (US); Matthew David Hornyak, Oakland, CA (US); Huy Quang Tran, San Jose, CA (US); Ryan James Case, Waterloo (CA)

(73) Assignee: Fitbit, Inc., San Francisco, CA (US)

(*) Notice: Subject to any disclaimer, the term of this patent is extended or adjusted under 35 U.S.C. 154(b) by 0 days.

(21) Appl. No.: 16/244,706

(22) Filed: Jan. 10, 2019

(65) Prior Publication Data
US 2019/0150089 A1 May 16, 2019

Related U.S. Application Data

(63) Continuation of application No. 14/072,687, filed on Nov. 5, 2013, now abandoned.

(51) Int. Cl.
H04W 52/02 (2009.01)
H04L 29/06 (2006.01)
H04W 76/14 (2018.01)
H04W 76/15 (2018.01)
H04W 12/00 (2009.01)
H04W 76/19 (2018.01)
H04W 76/34 (2018.01)

(52) U.S. Cl.
CPC ......... H04W 52/0229 (2013.01); H04L 69/14 (2013.01); H04W 76/14 (2018.02); H04W 76/15 (2018.02); H04W 12/00 (2013.01); H04W 76/19 (2018.02); H04W 76/34 (2018.02); Y02D 70/00 (2018.01); Y02D 70/142 (2018.01); Y02D 70/144 (2018.01); Y02D 70/22 (2018.01); Y02D 70/26 (2018.01)

(58) Field of Classification Search
CPC ...................................................... H04L 69/14
See application file for complete search history.

(56) References Cited

U.S. PATENT DOCUMENTS

D733,142 S 6/2015 Solomon et al.
D743,278 S 11/2015 Solomon et al.
(Continued)

FOREIGN PATENT DOCUMENTS

EP 2504961 10/2012
EP 002655142-0001 3/2015
EP 002655118-0001 4/2015

OTHER PUBLICATIONS

Restriction/Election Requirement issued in corresponding U.S. Appl. No. 14/072,687 dated May 4, 2015.
(Continued)

Primary Examiner — Hsinchun Liao
(74) Attorney, Agent, or Firm — Hogan Lovells US LLP

(57) ABSTRACT

Techniques are disclosed for intelligent management of multiple communications links. One communications link can be used to bring up another communications link with little or no user input. Selective enablement/disablement of one or more of the communications links is based on system needs and other criteria. Utilizing one more-secure communications link to improve security on another less-secure communications link between the same devices is also contemplated.

19 Claims, 3 Drawing Sheets

(56) References Cited

U.S. PATENT DOCUMENTS

| | | |
|---|---|---|
| D745,515 S | 12/2015 | Solomon et al. |
| 2003/0050009 A1 | 3/2003 | Kurisko et al. |
| 2013/0040610 A1 | 2/2013 | Migicovsky et al. |
| 2013/0109315 A1 | 5/2013 | Polo et al. |
| 2014/0073244 A1 | 3/2014 | Ko et al. |
| 2014/0094198 A1* | 4/2014 | Heo ............. H04W 52/0274 455/456.4 |
| 2015/0126117 A1 | 5/2015 | Wong et al. |
| 2015/0223033 A1 | 8/2015 | Migicovsky et al. |
| 2015/0223034 A1 | 8/2015 | Migicovsky et al. |
| 2015/0333302 A1 | 11/2015 | Johns et al. |
| 2015/0334772 A1 | 11/2015 | Wong et al. |

OTHER PUBLICATIONS

Non-Final Office Action issued in corresponding U.S. Appl. No. 14/072,687 dated Jul. 17, 2015.
Final Office Action issued in corresponding U.S. Appl. No. 14/072,687 dated Dec. 22, 2015.
Notice of Appeal filed in corresponding U.S. Appl. No. 14/072,687 on Mar. 22, 2016.
Appeal Brief filed in corresponding U.S. Appl. No. 14/072,687 on May 19, 2016.
Examiner's Answer to Appeal Brief issued in corresponding U.S. Appl. No. 14/072,687 on Sep. 8, 2016.
Notice of Defective Notice of Appeal issued in corresponding U.S. Appl. No. 14/072,687 on Oct. 16, 2017.
Notice of Abandonment issued in corresponding U.S. Appl. No. 14/072,687 dated Nov. 7, 2017.
Petition to Revive Unintentionally Abandoned Application filed in corresponding U.S. Appl. No. 14/072,687 on Jan. 9, 2019.

* cited by examiner

INTELLIGENT MANAGEMENT OF A PLURALITY OF COMMUNICATIONS LINKS

CROSS REFERENCE TO RELATED APPLICATIONS

This application is a continuation of U.S. patent application Ser. No. 14/072,687, filed Nov. 5, 2013, the full disclosure of which is hereby incorporated by reference herein for all purposes.

TECHNICAL FIELD

The disclosure herein relates generally to communications between devices over a plurality of communications links.

BACKGROUND

Many devices include interfaces allowing them to communicate with other devices. Such interfaces include different forms of wireless interfaces having different characteristics and capabilities. Examples of such wireless interfaces include cellular radios, WIFI, and Bluetooth. Such wireless interfaces are often included in devices such as personal computers, smartphones, game consoles, and tablets.

Bluetooth is a wireless standard that allows data to be exchanged between devices over short distances. The Bluetooth Smart or Bluetooth 4.0 specification includes Classic Bluetooth (BTC) as well as Bluetooth Low Energy (BLE). BTC reflects the traditional implementation of Bluetooth prior to the introduction of BLE, and BTC is supported on many legacy devices that do not support BLE. For example, some older smart phones only support BTC, while newer smartphones support both BTC and BLE.

While both BTC and BLE provide the ability to communicate data between devices, they each have their own advantages and disadvantages. For example, BTC provides higher bandwidth and works well for larger size data transfers. However, while BTC may be able to support transferring large amounts of data corresponding to music, pictures, or phone calls, it normally consumes more power than BLE. BLE provides the ability to send smaller amounts of data in a low-energy manner. While more power efficient for small transfers, BLE is not as secure as BTC, thereby rendering BLE connections more susceptible to eavesdropping. BLE also has a greater physical range than BTC, and therefore can allow communications between devices over greater distances.

In addition to Bluetooth, other wireless interfaces are available that also provide certain advantages and disadvantages. In such wireless interfaces it is often the case that a user can achieve greater data bandwidth at the expense of higher power consumption, more complex hardware for support, and greater cost in general. As portable devices continue to become more complex, more options for transferring data are presented. Therefore, it is desirable to provide techniques to allow for intelligent usage of available communications links on devices to facilitate data transfers in a manner that provides adequate bandwidth with reduced power consumption and cost.

DETAILED DESCRIPTION

Figure 1:
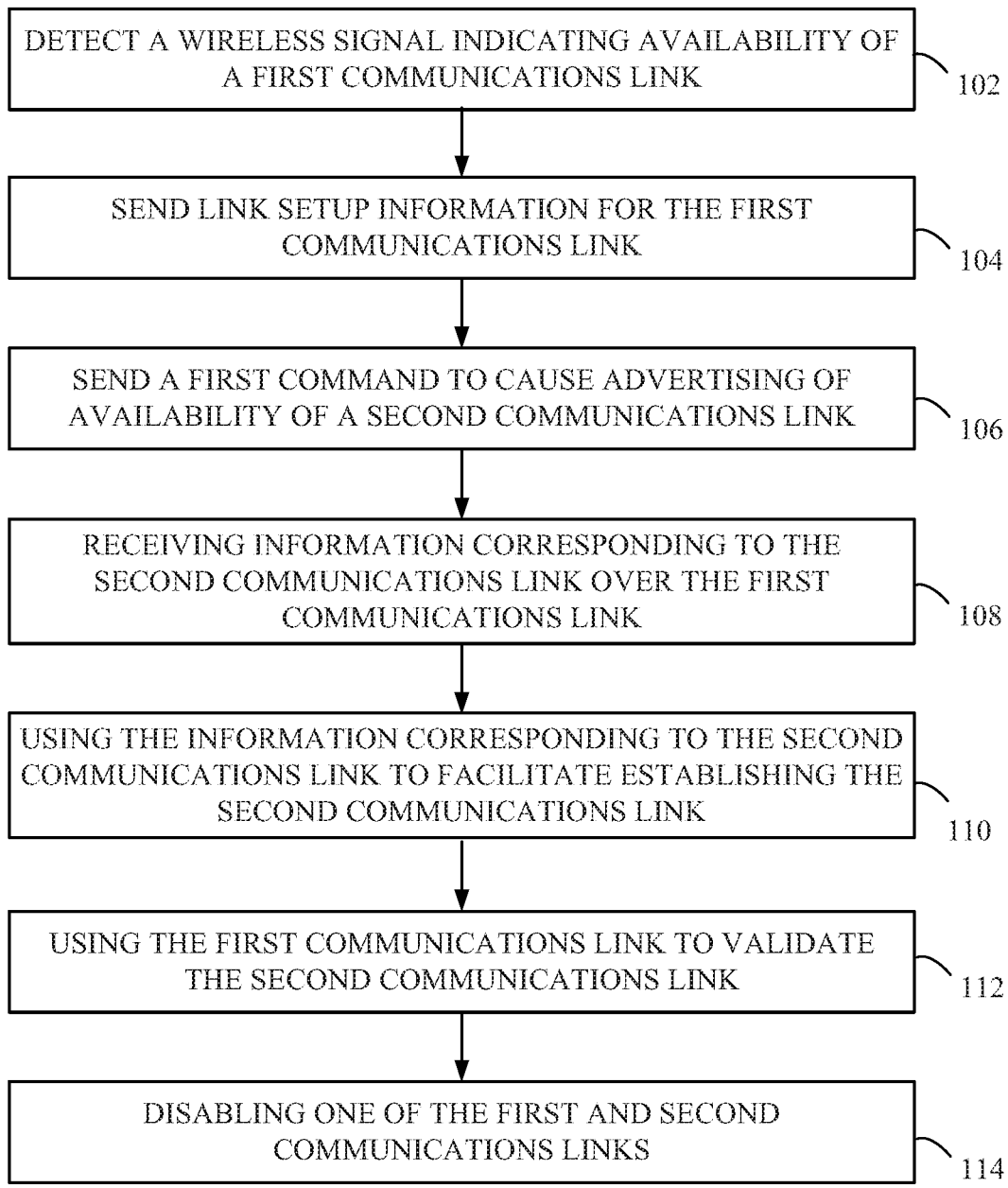
FIG. 1 is a flow chart of a method for management of communications links in accordance with an exemplary embodiment.

The following detailed description is merely illustrative in nature and is not intended to limit the embodiments of the subject matter or the application and uses of such embodiments. Any implementation described herein as exemplary is not necessarily to be construed as preferred or advantageous over other implementations.

For simplicity and clarity of illustration, the Figures depict the general methodology and/or manner of construction of the various embodiments. Descriptions and details of well-known features and techniques may be omitted to avoid unnecessarily obscuring other features.

Terms of enumeration such as "first," "second," "third," and the like may be used for distinguishing between similar elements and not necessarily for describing a particular spatial or chronological order. These terms, so used, are interchangeable under appropriate circumstances.

The terms "comprise," "include," "have" and any variations thereof are used synonymously to denote non-exclusive inclusion. The term "exemplary" is used in the sense of "example," rather than "ideal."

In the interest of conciseness, conventional techniques, structures, and principles known by those skilled in the art may not be described herein, including, for example, the specific protocols for wireless interfaces and circuits for implementing such interfaces included on devices.

During the course of this description, like numbers may be used to identify like elements according to the different Figures that illustrate the various exemplary embodiments. It is to be understood by any skilled in the art that the methods described below can be implemented on a computing device employing software modules and one or more processors and that the terms method, process, step, and action can be used to describe events occurring in one or more software modules implemented on a computing device.

Devices such as smartphones, laptops, and tablets include significant computing power that allows users to accomplish many tasks that would not have been possible with previous generation devices. Such devices typically provide a connection to large networks, such as the internet, that allow users to transfer data associated with certain applications running on the devices. Such devices also provide connections to user communication services through, for example, a cellular network or the internet, that allow user communication by voice, messaging, or email.

Other associated devices are designed to work in coordination with devices such as smartphones, where the associated devices may not have the same amount of computing power or connectivity features. For example, a peripheral device such as a smartwatch may provide more limited resources in terms of memory and may not provide a direct connection to cellular services or the internet. Instead, such associated devices can leverage, for example, a smartphone to provide access to the internet and other services such as text messages, email, and telephone services. In an example in which a smartwatch is paired with a smartphone, both devices include circuitry that allows for one or more communications links to be established between the devices for data transfers.

Many different communications protocols are currently available, and further refinements to such protocols are continuously being proposed and adopted. For example, Classic Bluetooth (BTC) has for many years provided a relatively low cost and convenient way to enable data transfers between devices over short distances. BTC has adequate bandwidth to support data associated with music, telephone calls, and photographs. For example, BTC interfaces in automobiles allow data associated with a cellular telephone call on a smartphone to be transferred to the audio/visual system in the car to allow the user to make and receive hands-free calls. Similarly, BTC headsets allow voice data to be transferred between the headset and a corresponding smartphone. In the context of communications links, BTC provides reasonable bandwidth over short distances.

A more recently developed protocol is Bluetooth Low Energy (BLE). While BLE provides lower power consumption than BTC, it is less secure and is more bandwidth limited, thereby making it less useful for applications requiring large data transfers such as telephone calls, music, photographs, and the like. BLE does allow for communication over greater distances, and the lower power consumption associated with BLE is especially desirable in devices in which battery life is important.

Other wireless communications links, including cellular service and WIFI, provide other advantages, but are often more costly and complex. As one of ordinary skill in the art appreciates, different devices having different levels of complexity and cost will include one or many communication interfaces, where the specific interfaces provided on the device will depend on many factors. Being able to intelligently leverage available communications links in an optimal manner to achieve the data transfer objectives with minimal cost and power consumption can help improve device performance and extend the battery life. Intelligent management of such communications links can also allow for a better user experience in that the user can rely on the devices themselves to determine the best available communications link for various tasks, thereby avoiding undue power consumption or inadequate data bandwidth for the applications the user is executing.

Intelligent management of available communications links can include leveraging an already established communications link to establish a second communications link that may have different characteristics. One link can then be used to help improve security on the other link or to perform other verification procedures that ensure eavesdropping by unauthorized users is not permitted. Dynamic switching between the communications links based on the bandwidth needs can be used to selectively employ higher bandwidth links when needed, while powering down such links and using lower-bandwidth links with lower power consumption when high bandwidth is no longer needed. Similarly, the higher range of some links (e.g. BLE vs. BTC) can be used when devices are more physically distant. In such an instance, a later determination that the devices are within the range of a different communications link having more desirable attributes (e.g. higher bandwidth BTC) may result in disabling the higher-range link and bringing up the shorter-range, higher-bandwidth link.

The control mechanisms for supporting the intelligent management of the communications links can be centered in one device or distributed such that either device (or any device in the case of an ad-hoc network) can control the particular communications links that are being utilized by the respective devices. For example, in the context of a smartwatch-smartphone system, software running on the smartphone may determine that BTC is initially preferable in order to facilitate data transfers associated with certain applications, where the software later determines that BLE is preferable as high bandwidth is no longer needed and power savings is desirable. In another scenario, while the smartwatch and smartphone are initially communicating over BLE in order to conserve power, the smartwatch may determine that a large data transfer to the smartphone is needed, and, as a result, the smartwatch may initiate disabling BLE and re-establishing a BTC link.

The intelligent management of the various links can be further facilitated by allowing users or developers of applications to specify when a particular link should be utilized. For example, an application developer may know when the application will need additional bandwidth and may include commands that switch between higher bandwidth links, such as BTC, and lower-cost or power-saving links, such as BLE, based on the known bandwidth needs of the application. Similarly, while an intelligent control system may determine that a lower-bandwidth link is adequate for a particular data transfer and would normally select that link based on the advantages it provides (e.g. power savings, lower cost, increased security, etc.), a user may be willing to pay an extra cost, consume more power, or compromise some aspects of security in order to accomplish the data transfer more quickly. As such, in some embodiments, parameters entered by the user or specified by an application may be taken into account when determining the appropriate link to utilize at any one point in time.

In order to aid in the description of embodiments of the invention, a smartphone-smartwatch system is used herein as a typical example embodiment. While providing an illustrative example for the techniques described, such example embodiments should not be viewed as limiting. As one of ordinary skill in the art appreciates, many other devices that include support for multiple communications links would benefit from the techniques described herein.

FIG. 1 illustrates a flow diagram corresponding to a method for intelligently managing a plurality of communications links. At step 102, a first device detects a wireless signal originating from a second device. The detected wireless signal indicates availability of a first wireless communications link. In one embodiment, the first device is a smartphone and the second device is a smartwatch. In such an embodiment, the smartphone detects the presence of the smartwatch based on a signal transmitted by the smartwatch. For example, the smartphone may be instructed to look for a signal from the smartwatch or it may simply detect a periodic signal emitted by the smartwatch indicating that the smartwatch is capable of connecting with the smartphone.

At step 104, after the first device has detected the wireless signal from the second device, the first device sends first communications link setup information corresponding to establishing the first communications link. In one example embodiment, the first communications link corresponds to a BTC link, and the first device, which is a smartphone, sends information to the second device, which is a smartwatch, that allows the BTC link to be established between the two devices. Such information may include address information for the smartphone. In response to the information sent to the second device, the second device may respond with information needed by the first device to establish the first communications link. Such information would be received by the first device and used in establishing the first communications link.

Once the first communications link is established, that existing communications link can be used to bring up or "bootstrap" a second communications link. After the first communications link is in place, the first device sends a first command over the first communications link at step 106. The first command is configured to cause the second device to begin advertising availability of a second communications link, which is another wireless communications link having different characteristics than the first communications link. In some embodiments, prior to sending the first command, the first device prompts a user with a query as to whether to initiate communication with respect to the second communications link such that the user can decide whether or not to enable the second communications link. In other embodiments, initiating communication with respect to the second communications link may always occur or may be based on instructions received from applications running on the first device or parameters already configured by the user on the first device.

In an example embodiment, step 106 may include the smartphone using the established BTC link to instruct the smartwatch to begin advertising its availability to establish a BLE link. Such advertising typically includes periodically broadcasting a packet that may include the BLE address of the smartwatch. If the smartphone does not detect a response from the smartwatch within a predetermined period of time, the smartphone may repeat the issuance of the command. Because the advertising by the smartwatch is in direct response to instructions from the smartphone based on its desire to pair with the smartwatch over BLE, the advertising may be "high-power" advertising where a packet is sent more frequently than might normally occur absent a specific directive to advertise. Because advertising consumes power on the smartwatch, a timeout may be associated with the advertising such that the smartwatch does not continue to advertise and consume power if a response to its advertising is not received within a predetermined period of time.

At step 108, the first device receives information corresponding to the second communications link over the first communications link. In some embodiments, the information corresponding to the second communications link is the address for the second device on the second communications link. In other embodiments, the information provides the first device with other details regarding the second communications link that allow the second communications link to be established. At step 110, the first device uses the information received over the first communications link to facilitate establishing the second communications link. In one embodiment, the first device uses an address provided over the first communications link to connect with the second device and establish the second communications link. For example, a smartwatch may send a BLE address over the BTC link to a smartphone that uses that address to establish the BLE link.

Because some communications links provide more secure data transfers than others, some embodiments described herein use more secure communications links to enhance the security of less secure communications links. For example, the method depicted by the flow diagram of FIG. 1 further includes step 112 at which the second communications link is validated using the first communications link. In one embodiment, the first device receives a security code over the first communications link. For example, the security code may be a code generated by a smartwatch that is sent to a smartphone. The first device can then send verification information corresponding to the security code back to the second device over the second communications link. Thus, if the first communications link is a more secure link, such as a BTC link, the security code generated by the second device will only be received by the first device. If the verification information, which may be the security code itself or some other response derived using the security code, is not returned to the second device over the second communications link, the second device will know that the second communications link that it has established or is in the process of establishing is not valid. When such an invalid communications link is detected, the link can be disabled, and, in some embodiments, the user can be notified of an attempt to eavesdrop such that additional security measures can be taken.

In a specific example, a smartwatch may generate a random security code that it sends over a BTC link to the smartphone. The smartphone may simply return the code to the smartwatch over the BLE link or it may use the code to derive some other verification information that is sent back over the BLE link. If the smartwatch determines that the expected verification information has been received from the smartphone, it knows that the BLE link is properly set up with the appropriate device and therefore valid. In such a scenario, if an eavesdropper notices when advertising by the smartwatch commences and attempts to connect to the smartwatch, the eavesdropper will not be aware of the security code that had been sent over the more secure BTC link. As such, the eavesdropper will be unable to connect to the smartwatch.

Other techniques may be used to leverage one link that is more secure to improve security with respect to a second, less-secure link. For example, the first device may receive a first security code over the first communications link and a second security code over the second communications link. The first device can then compare the first and second security codes or correlate the first and second security codes in some other manner to verify the second communications link. Because one of the codes is sent over the more-secure link, an eavesdropper would be unable to provide the needed code on the less-secure communications link.

In yet other embodiments, other out-of-band channels may be used to authenticate a communications link. For example, authentication may be based on having one device display a particular code or image, where the other device is able to capture or detect that image to confirm, either based on having provided information to the other device prompting the displayed image or based on information received from the other device indicating what the image should be, that the other device is displaying the proper image or code. In a specific example, a smartphone could send a particular Quick Response (QR) code to a smartwatch over a BLE link. The smartwatch then displays the QR code, and the phone, through the use of a camera, can detect the QR code to verify that the smartwatch received the code sent over the BLE link.

Another verification technique uses a "bump" between the devices to verify a communications link. Such a "bump" is a known technique that relies on variables and sensor data on the devices to determine that the two devices have been bumped together. The variables and sensor data may include location of the device, accelerometer readings, and an IP address. Similarly, a vibration generated by one device could be correlated with detection of the vibration on the other device (e.g. with an accelerometer). Such exchanges allow devices to physically confirm their identities with respect to a communications link.

Thus, one of the communications links can be used to assist in establishing the other communications link in a manner than minimizes or eliminates the need for any interaction with the first or second device on the part of the user.

Once both the first and second communications links have been established, intelligent usage of the links includes disabling one of the communications links at step 114. For example, in the case of a smartphone communicating with a smartwatch over BTC and BLE, if the data traffic and applications on the devices do not require the added security, greater bandwidth, or other features of BTC, the BTC link may be disabled while the BLE link is maintained. The BLE link consumes less power than the BTC link, thereby improving battery life of the smartwatch and smartphone. If it is later determined that the features of the BTC link are needed, the BTC link can be re-established using the BLE link. At that point, it may be desirable to disable the BLE link to save power as the communications between the devices can be handled over the BTC link until it is determined that the features of BTC are no longer needed. The BTC link can then be used to re-establish the BLE link, and the BTC link can be disabled once again.

In order to keep the user apprised as to which of the communications links are currently available for data traffic, one or more of the devices can include a display, where information regarding the communications links is shown on the display. For example, the display can show whether both BLE and BTC are available and/or whether communications links corresponding to those protocols are currently enabled.

In the specific example of a system with both a BTC and a BLE link, if both links are active, the Bluetooth specification currently mandates that BLE traffic be sent over the BTC link. As such, the power savings expected with BLE traffic is not realized. In order to obtain the power savings, the BTC link is disabled, thereby forcing the BLE traffic to travel over the more power-efficient BLE link.

Disabling one of the first and second communications links may be accomplished by the first device sending a command to the second device to disable the connection to be disabled. In such an embodiment, a later command sent over the maintained link may indicate that the disabled link should be re-established. In other embodiments, disabling is accomplished by the first device simply dropping the communications link to be disabled.

Determining which of the communications links should be maintained and which should be disabled can be based on a number of factors. In some embodiments, an application running on the first device may determine which link should be used while that application is running. For example, an application that sends a large amount of data from a smartphone to a smartwatch can specify that BTC should be used. In other embodiments, control circuitry on the device may determine which link is appropriate based on an aggregation of the bandwidth needs for the communications between the devices. Such circuitry may rely on parameters on the device in making the decision as to which link is appropriate. Such parameters may include specifications corresponding to the device characteristics, user configurable parameters, cost determinations, or parameters that are included in, or modified by, applications on the device.

As noted above, BLE has a greater physical range than BTC. As such, if a BTC link between the devices is lost because the devices are separated by too much distance, the BLE link may be maintained. Later the BTC link can be reestablished when physical proximity of the devices allows for the BTC communication. BLE also allows for a reasonable determination as to physical distance between two devices connected by a BLE link. Such distance determinations can allow different links to be turned on based on the positional information provided. Further examples of the use of such distance information include "beacons" or other devices that are constantly advertising a particular address that allows a BLE device detecting that advertising to know its approximate location. In one example, a BLE beacon may indicate that presence of WIFI. If the range of BLE is, for example, 100 meters, while the range of the WIFI is 25 meters, BLE can be used to inform the device when it is in range of the WIFI communications link. In other embodiments, non-wireless "beacons" may be employed. For example, a constant source of light or sound may indicate the location of a communication port providing an available communications link for the device. As a user approaches the beacon, the information provided by the beacon can be detected by the device and used as a trigger to bring up a particular communications link.

In addition to the first device making a selection as to which of the communications links is to be maintained, a command or other indication can be sent from the second device to the first device instructing the first device to bring up a particular communications link. For example, if a smartwatch determines that it needs to do a large data transfer, it can send a command to the smartphone over a BLE link instructing the smartphone to re-establish a BTC link and then disable the BLE link. Thus, the intelligent management of the available communications links is able to take into account the needs of both devices, the user, and the applications running on the devices.

Figure 2:
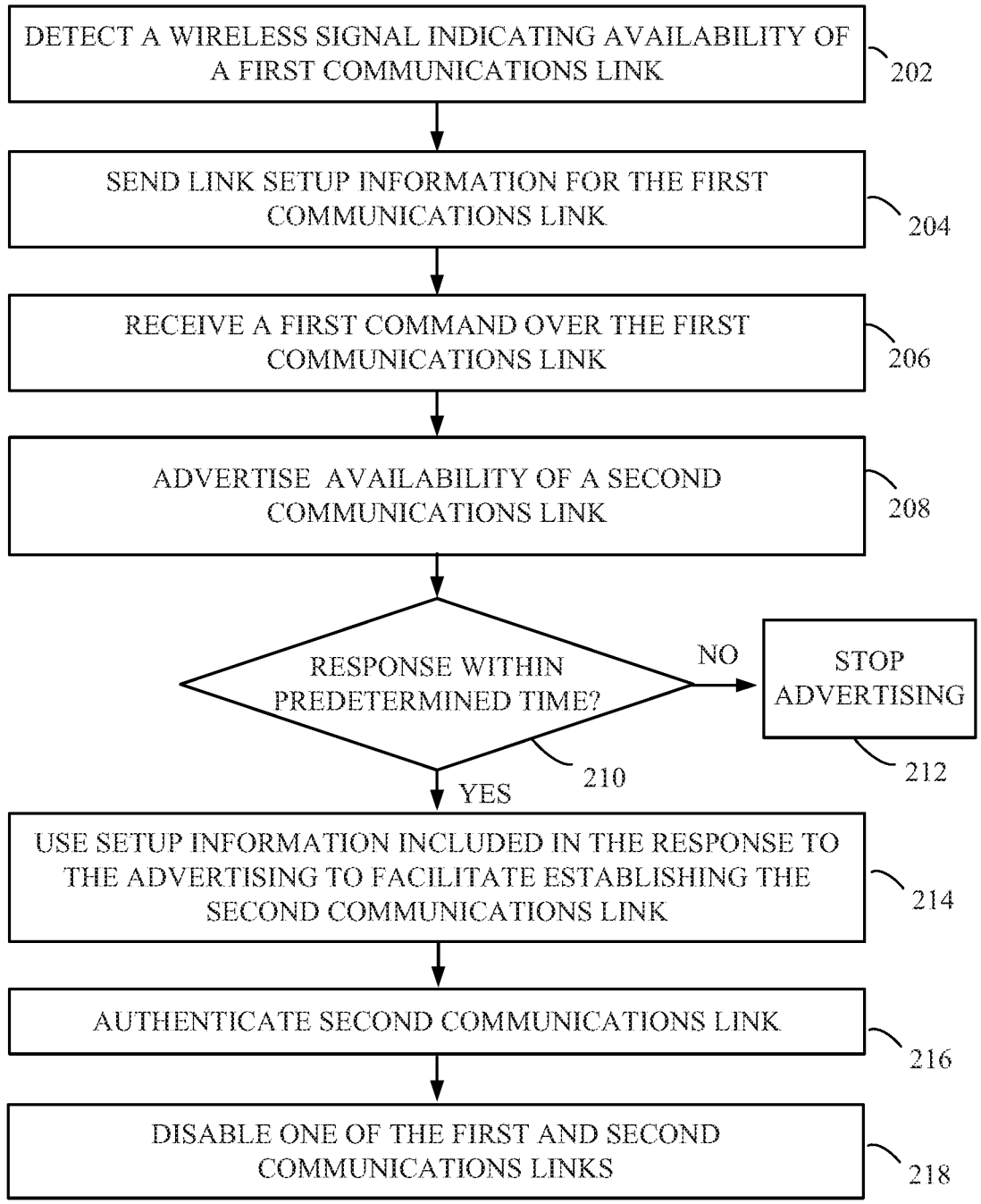
FIG. 2 is a flow chart of a method for management of communications links in accordance with another exemplary embodiment.

FIG. 2 illustrates another embodiment of a method for utilizing a plurality of communications links. The actions depicted in FIG. 2 are from the perspective of a device that performs the advertising with respect to a second communications link in contrast to the device that sends a command asking the other device to perform that advertising. In one example embodiment, the actions of FIG. 2 correspond to those performed by a smartwatch that transfers data with a smartphone using both BTC and BLE links. In discussing the flow diagram of FIG. 2, such an example embodiment is assumed in order to aid in describing the actions performed by the respective devices. The use of such an example embodiment is not intended to limit the teachings provided herein, and one of ordinary skill in the art appreciates that devices other than a smartwatch and a smartphone can practice the actions described in the context of FIG. 2. Moreover, while the specific example communications links are described as BTC and BLE links between the smartphone and smartwatch, other communications links may be managed in the same or similar way in other embodiments.

At step 202 a wireless signal originating from the smartphone is detected by the smartwatch. The wireless signal indicates the availability of a first communications link. In one example embodiment, the first communications link is a BTC link. At step 204, the smartwatch sends link setup information for the first communications link to the smartphone, where the information corresponds to establishing the first communications link.

At step 206, a command is received by the smartwatch over the BTC link, where the command instructs the smartwatch to begin advertising availability of a second communications link. The second communications link is preferably another wireless communications link, and, in the example embodiment, the second communications link is a BLE link. At step 208, the smartwatch advertises the availability of the second communications link in response to the received command. As discussed above with respect to FIG. 1, because the advertising is in response to a specific command directed at establishing a BLE link, the advertising may be "high-power" in the sense that packets are sent more frequently by the smartwatch. At step 210, the smartwatch determines whether it has gotten a response to its advertising within a predetermined period amount of time. Because the advertising consumes power, in some embodiments it is useful to determine that the smartphone is not responding to the advertising such that the advertising can be terminated in order to save power. As such, if it is determined at step 210 that a response has not been received within the predetermined time period, the smartwatch will stop advertising the BLE link at step 212.

If a response to the advertising is received within the predetermined period of time, at step 214 setup information included in the response is used by the smartwatch to facilitate establishing the second communications link, which, in the example embodiment, is a BLE link. In some embodiments, authentication of the second communications link is performed at step 216. Because BLE is inherently insecure, the BTC link can be used to provide secure communications between the smartwatch and smartphone that allow the BLE link to be validated. As discussed above with respect to FIG. 1, such validation may include out of band operations utilizing, for example, the display of the watch, or it may include the watch generating one or more security codes that are sent to the smartphone.

In one embodiment, the smartwatch generates a first security code and sends that code to the smartphone over the BTC link. The smartwatch also generates a second security code that is sent over the BLE link. Validation can then be performed by the smartphone based on the two security codes.

In another embodiment, the smartwatch generates a security code that is sent to the smartphone over the more-secure BTC link. The smartphone then sends a responsive code over the BLE link to the smartwatch, and, once received by the smartwatch, the responsive code can be compared with the security code to determine if the BLE connection is in fact with the device to which the security code had been sent. If the comparison determines that the connection is not valid, the smartwatch can terminate the BLE link. Because an invalid link likely indicates the presence of an attempted eavesdropper, the smartwatch may also provide an alert corresponding to the determination such that the user of the smartwatch is aware of the eavesdropping attempt.

In addition to providing additional security with respect to establishing the connection, the more secure communications link can also be used to enhance other aspects of the security on the less-secure link. For example, security information such as an encryption key can be sent over the more secure link and then used in transferring data over the less secure link.

Once both the BLE and BTC links have been established or the use of the initial link is no longer necessary to establish the second, the smartwatch can disable one of the links at step 218. As discussed above, the control of which of the links is maintained and which is disabled may be performed by the smartwatch, the smartphone, or by either device based on criteria of which each is aware. For example, the smartwatch may determine that a particular application running on the smartphone requires a particular one of the communication links and therefore will maintain that link while disabling the other. For example, if the smartwatch includes a camera and a picture is taken, the amount of data associated with pictures may result in the smartwatch determining that the BTC link should be used to send the data to the smartphone. The determination could be based on the mere fact that an application using a camera is active or it may be based on a determination that the bandwidth for a picture or group of pictures that have already been taken requires BTC instead of BLE. Parameters stored on the smartwatch can also be used in making the determination as to which of the links is maintained, where the parameters may be, for example, user-configurable, static, or set based on a particular application being executed on the smartwatch.

One of ordinary skill in the art appreciates that while the present description focuses on choosing one of two possible communications links at any particular point in time, there may be times at which multiple communications links are maintained as active as different traffic may be able to benefit from the characteristics of the different links. As an example, if it were permissible to send BLE traffic over a BLE link when a BTC link is also active between two devices, there may be scenarios where it is desirable to maintain both links simultaneously to allow separate traffic to flow over the separate links.

In one embodiment, disabling one of the communications links by the smartwatch can be accomplished by the smartwatch simply dropping the communications link. In other embodiments, the smartwatch sends a command or other indication to the smartphone indicating which of the communications links is to be maintained and which is to be disabled, and the smartphone responds accordingly. In yet other embodiments, the directive to maintain or disable one of the communications links may be sent from the smartphone to the smartwatch, where the smartwatch receives a command and disables one of the communications links in response to the command.

Figure 3:
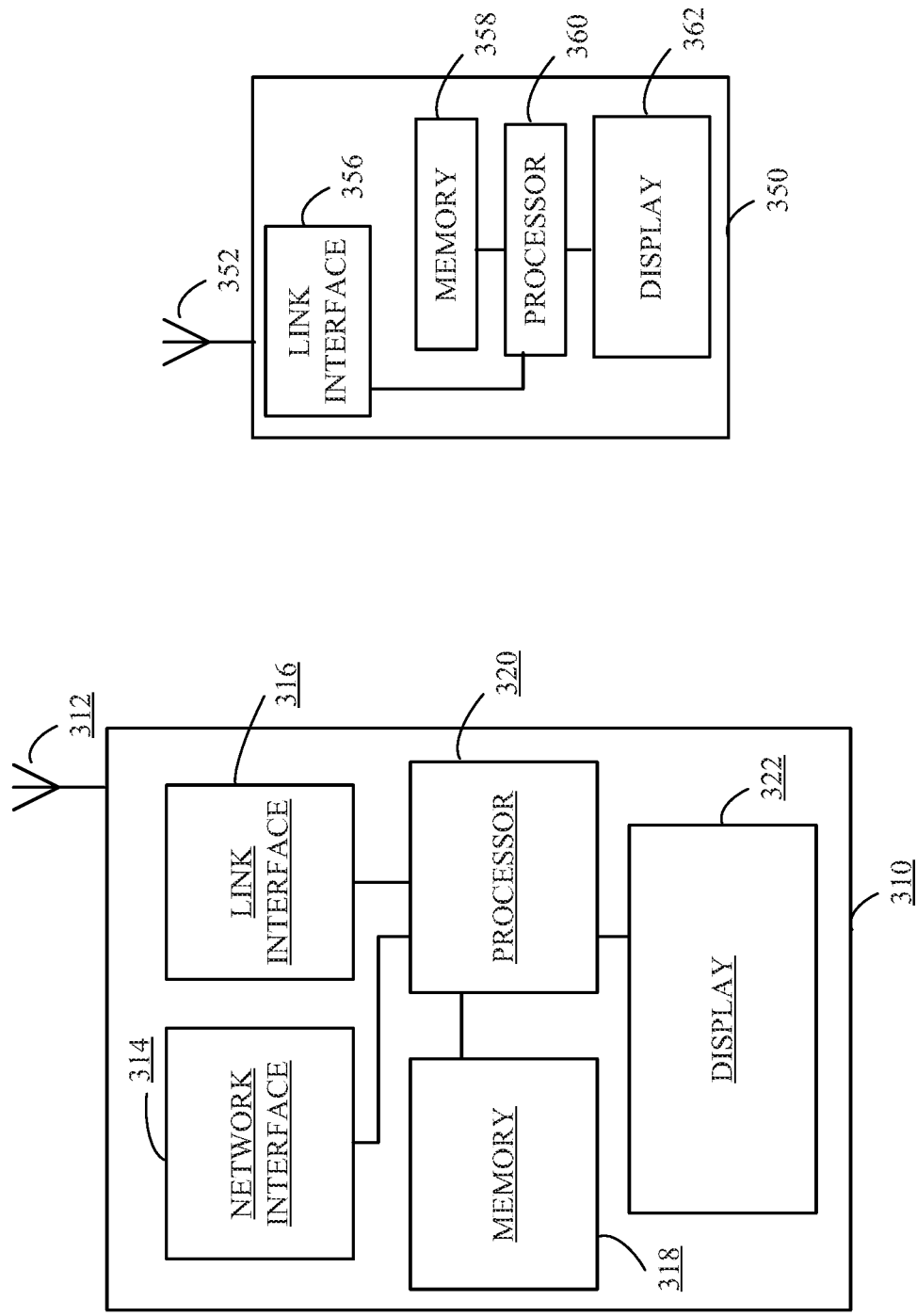
FIG. 3 is a block diagram of devices supporting a plurality of communications links for data transfer between the devices in accordance with an exemplary embodiment.

FIG. 3 illustrates a block diagram of a system including devices 310 and 350. Each of devices 310 and 350 includes at least one antenna 312, 352, respectively, that facilitates transmission and reception of wireless signals. Device 310, which in one embodiment is one of a smartphone, tablet, laptop, or other computing device, includes a display 322 that may present an interface that allows a user to interact with the device. In other embodiments, device 310 may not include a display, and instead may provide the ability to connect to an external display or some other means of interacting with a user. Device 310 includes a network interface 314 that allows the device 310 to connect to a network such as the internet. The network interface 314 may be a WIFI interface, a cellular interface, or other interface that allows for communication with the external network. Device 310 also includes a link interface 316 for facilitating communications links with device 350 and other devices having the ability to establish such links. In one embodiment, the link interface 316 supports both BTC and BLE links. As one of ordinary skill in the art appreciates, network interface 314 and link interface 316 may be circuits that include discrete components or are integrated onto one or more chips.

Device 310 typically includes input/output (I/O) capability based on, for example, a keyboard or touchscreen, which are not shown. Device 310 also includes a processor 320 and memory 318. The device 310 may include one or more processors 320, such that the processor 320 is a single central-processing unit, or a plurality of processing units, commonly referred to as a parallel processing environment. The processor 320 may be a microcontroller that includes other aspects of the device 310, including memory 318, the network interface 314, and the link interface 316.

The processor 320 in device 310 is capable of executing a computer program to execute a computer process. Data and program files may be input to the device 310, which reads the files and executes the programs therein. Programs and configuration parameters, such as those discussed above, may be stored in memory 318. Also contemplated herein is a non-transitory computer readable medium that stores a program that causes the processor 320 to execute a process, where the process may include the steps shown and described above with respect to FIGS. 1 and 2. Such a program or a part thereof can be stored in various types of media for retention, distribution, etc. The contemplated tangible computer-readable memory media include memory devices (SDRAM, DDR SDRAM, RDRAM, SRAM, flash memory, and various types of ROM, etc.), as well as storage media or memory media such as magnetic (e.g., disk) or optical media (e.g., CD, DVD, and related technologies, etc.). The tangible computer-readable memory media may be either volatile or nonvolatile memory.

Device 350, which in one embodiment is a smartwatch or other peripheral device, also includes a display 362 that may present an interface that allows a user to interact with the device. In other embodiments, device 350 does not include a display. Device 350 includes a link interface 356 for facilitating communications links with device 310 and other devices having the ability to establish such links. In one embodiment, the link interface 356 supports both BTC and BLE links. While not shown, device 310 may also include other user input/output mechanisms. Moreover, device 310, while shown to be simpler than device 310 in that it lacks a network interface, may include a network interface that allows the device 350 to connect to a network such as the internet. As is the case with network interface 314, the network interface that may be present in device 350 may be a WIFI interface, a cellular interface, or other interface that allows for communication with the external network.

The device 350 includes a processor 360 and memory 358, which like processor 320 and memory 318 of device 310 may include many variations of processor(s) or memories. As was the case with device 310, device 350 stores or receives software that, when executed by the processor 360, allows the device 350 to practice some or all of the steps discussed above in the context of FIGS. 1 and 2.

Thus, devices 310 and 350 represent two example devices that can communicate over multiple communications links via their respective link interfaces 312 and 352. As discussed and described above with respect to FIGS. 1 and 2, providing intelligent management of the communications links between devices 310 and 350 has many advantages, including improved performance, reduced cost, increased security, and reduced power consumption.

Software for execution by the processor 320 may include applications downloaded from the network, where, when extracted or executed by the processor 320 cause additional data to be sent to device 350 for storage in memory 358 and execution by processor 360. Such applications thereby include execution aspects to be performed by device 310 as well as device 350. For example, an application may relate to receiving data from the internet, where the application software causes the device 310 to selectively forward portions of the data to the device 350 over one or more of the communications links. A portion of the application software specific to the device 350 that is executed by the processor 360 may then use the transferred data to display information associated with the data.

While exemplary embodiments have been presented above, it should be appreciated that many variations exist. Furthermore, while the description focuses on smartphones and smartwatches in exemplary embodiments, the teachings may be applied to various devices that communicate over multiple communications links. It should also be appreciated that the exemplary embodiments are only examples, and are not intended to limit the scope, applicability, or configuration of the inventions in any way.

What is claimed is:

1. A computer-implemented method, comprising:
    under the control of one or more computer systems configured with executable instructions,
        establishing a first communications link between a mobile device and a peripheral device;
        sending, from the peripheral device to the mobile device, information indicating availability of a second communications link between the mobile device and the peripheral device;
        establishing the second communications link between the mobile device and the peripheral device;
        determining that communicating over a specified communications link of the first communications link and the second communications link results in less secure communication between the mobile device and the peripheral device, the specified communications link employing an encryption level less than 128-bit encryption; and
        terminating the specified communications link.

2. The computer-implemented method of claim 1, further comprising:
    authenticating the information indicating availability of the second communications link before establishing the second communications link.

3. The computer-implemented method of claim 2, wherein authenticating the information indicating the availability of the second communications link comprises:
    sending, from the mobile device to the peripheral device, data representing an image;
    displaying the image on the peripheral device based on the data representing the image;
    capturing, using a camera of the mobile device, the image; and
    determining that the captured image corresponds to the data representing the image.

4. The computer-implemented method of claim 1, wherein the first communications link comprises Classic Bluetooth and the second communications link comprises Bluetooth Low Energy.

5. A computer-implemented method, comprising:
    under the control of one or more computer systems configured with executable instructions,
        establishing a first communications link between a mobile device and a peripheral device;
        receiving at the peripheral device, over the first communications link, a first command from the mobile device;
        sending, from the peripheral device, based at least in part on the peripheral device receiving the first command, information indicating availability of a second communications link between the mobile device and the peripheral device;
        establishing the second communications link between the mobile device and the peripheral device; and determining that communicating over a specified communications link of the first communications link and the second communications link results in less secure communication between the mobile device or the peripheral device, the specified communications link employing an encryption level less than 128-bit encryption.

6. The computer-implemented method of claim 5, further comprising:
determining that communicating over the specified communications link of the first communications link and the second communications link results in greater power consumption for one of the mobile device or the peripheral device.

7. The computer-implemented method of claim 5, further comprising:
terminating the specified communications link.

8. The computer-implemented method of claim 5, wherein the information indicating availability of the second communications link includes an image displayed on the peripheral device, the image displayed at least in part based on the first command sent from the mobile device, the method further comprising:
determining, by the mobile device, that the image is displayed on the peripheral device.

9. The computer-implemented method of claim 5, wherein the first communications link comprises Classic Bluetooth and the second communications link comprises Bluetooth Low Energy.

10. The computer-implemented method of claim 5, further comprising:
displaying, on a display of the mobile device, indicia that the first communications link and the second communications link have been established; and
receiving touch input, from the display, to terminate at least one of the first communications link or the second communications link.

11. A system, comprising:
at least one processor;
memory including instructions that, when executed by the at least one processor, cause the system to:
establish a first communications link between a mobile device and a peripheral device;
receive at the peripheral device, over the first communications link, a first command from the mobile device;
send, from the peripheral device, based at least in part on the peripheral device receiving the first command, information indicating availability of a second communications link between the mobile device and the peripheral device;
establish the second communications link between the mobile device and the peripheral device; and
determine that communicating over a specified communications link of the first communications link and the second communications link results in less secure communication between the mobile device or the peripheral device, the specified communications link employing an encryption level less than 128-bit encryption.

12. The system of claim 11, wherein the memory further includes instructions that, when executed by the at least one processor, cause the system to:
periodically emit connection availability information from the peripheral device;
wherein establishing the first communications link includes detecting the connection availability information at the mobile device; and
wherein the first command is sent from the mobile device to the peripheral device based at least in part on detecting the connection availability information.

13. The system of claim 11, wherein the memory further includes instructions that, when executed by the at least one processor, cause the system to:
determine that communicating over the specified communications link of the first communications link and the second communications link results in greater power consumption for one of the mobile device or the peripheral device.

14. The system of claim 11, wherein the memory further includes instructions that, when executed by the at least one processor, cause the system to:
terminate the specified communications link.

15. The system of claim 11, wherein the information indicating availability of the second communications link between the mobile device and the peripheral device includes a device address for the peripheral device.

16. The system of claim 11, wherein the memory further includes instructions that, when executed by the at least one processor, cause the system to:
before establishing the second communications link, display, on a display of the mobile device, a prompt that the second communications link is available; and
wherein establishing the second communications link includes receiving, in response to the prompt, an indication to allow establishment of the second communication link.

17. The system of claim 11, wherein the first communications link comprises Classic Bluetooth and the second communications link comprises Bluetooth Low Energy.

18. The system of claim 11, wherein the information indicating availability of the second communications link includes a distance between the mobile device and the peripheral device.

19. The system of claim 11, wherein the memory further includes instructions that, when executed by the at least one processor, cause the system to:
display, on a display of the mobile device, indicia that the first communications link and the second communications link have been established; and
receive input to terminate the specified communications link.

* * * * *